United States Patent
Hiestand et al.

[11] 3,914,225
[45] Oct. 21, 1975

[54] N-HETEROCYCLIC PERFLUOROALKYLCARBOXYLIC ACID ESTERS

[75] Inventors: Armin Hiestand, Binningen; Horst Jäger, Bettingen, both of Switzerland

[73] Assignee: Ciba-Geigy AG, Basel, Switzerland

[22] Filed: Jan. 25, 1974

[21] Appl. No.: 436,553

[30] Foreign Application Priority Data
Feb. 2, 1973 Switzerland.................... 1562/73

[52] U.S. Cl.............. 260/248 NS; 8/115.6; 106/48; 117/132 CF; 117/142; 117/135.5; 117/143 A; 117/138.5; 117/161 UG; 252/8.75; 252/8.57; 260/868; 260/309.5; 260/309.7
[51] Int. Cl.²............. C07D 251/34; C07D 233/76; C07D 233/34
[58] Field of Search............................ 260/248 NS

[56] References Cited
UNITED STATES PATENTS
3,770,731  11/1973  Jaeger................................ 260/248

FOREIGN PATENTS OR APPLICATIONS
2,077,548  10/1971  France
1,315,987   9/1973  United Kingdom

*Primary Examiner*—John M. Ford
*Attorney, Agent, or Firm*—Joseph G. Kolodny; Prabodh I. Almaula; Edward McC. Roberts

[57] ABSTRACT

The present invention provides new perfluoroalkylcarboxylic acid esters of the formula

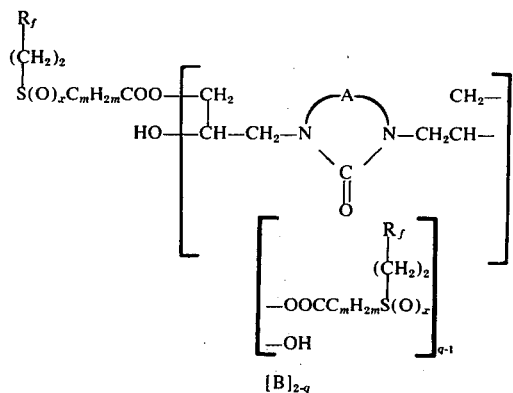

wherein $R_f$ is perfluoroalkyl with 4 to 18 carbon atoms, A represents a radical forming with the —N—CO—N—group ethylene urea, hydantoin or isocyanurate radicals, $m$ is a whole number from 1 to 3, $q$ is 1 or 2 and $x$ is 0, 1 or 2, with $x$ being 0 or 1 if $m$ is 1. The new compounds are useful for producing oil and water-repellent finishes on porous and non-porous finishes, such as paper, textiles or plastics.

12 Claims, No Drawings

N-HETEROCYCLIC PERFLUOROALKYLCARBOXYLIC ACID ESTERS

The present invention provides perfluoroalkylcarboxylic acid esters of the formula (1)

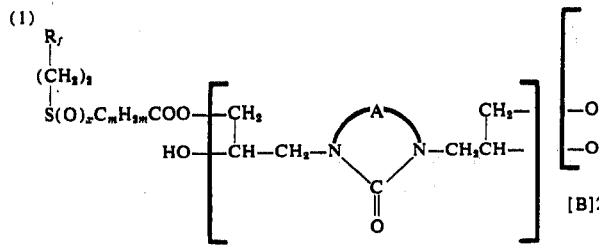

wherein $R_f$ represents a perfluoroalkyl radical with 4 to 18 carbon atoms, A represents a radical of the formula

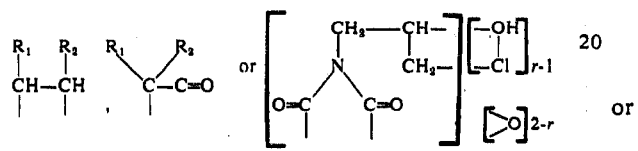

wherein $R_1$ and $R_2$ represent hydrogen or methyl and $r$ is 1 or 2, B is [—O—] or [—OH Cl—], $m$ is a whole number from 1 to 3, $q$ is 1 or 2 and $x$ is 0, 1 or 2, with $x$ being 0 or 1 if $m$ is 1.

The compounds according to the invention contain one or two perfluoroalkyl groups, preferably one such group, of the formula
$$R_f-(CH_2)_2-S(O)_x-C_mH_{2m}-COO$$
wherein $R_f$, $m$ and $x$ have the indicated meanings, and they contain accordingly 2, 1, or 0, preferably 2 or 1 epoxide or chlorohydrin groups, in the molecule. The isocyanurate derivatives contain preferably 2 epoxide or chlorohydrin groups, the ethylene urea and hydantoin derivatives one epoxide or chlorohydrin group.

The perfluoroalkyl radical $R_f$ contains from 4 to 18 carbon atoms and can be straight-chain or branched. It can have the following formulae:

| | |
|---|---|
| $F(CF_2)_a$— | $a = 4$ to 18 |
| $(CF_3)_2CF(CF_2)_b$— | $b = 1$ to 15 |
| $CF_3[CF_2CF(CF_3)]_c$— | $c = 1$ to 5 |
| $(CF_3)_2CF[CF_2CF(CF_3)]_d$— | $d = 1$ to 5. |

The perfluoroalkyl radical contains preferably from 4 to 14 or from 6 to 12 carbon atoms.

The perfluoroalkylcarboxylic acid esters preferably have the formula (2)

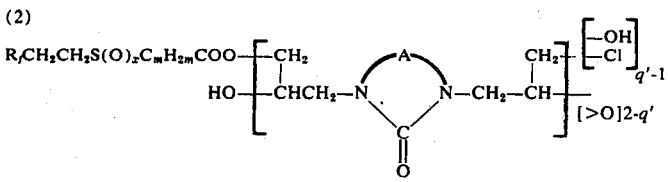

wherein $R_f$ represents a perfluoroalkyl radical with 4 to 18 carbon atoms, A represents a radical of the formula

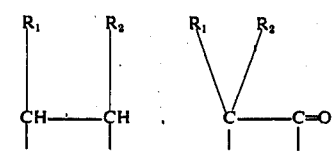

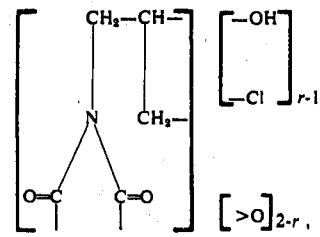

wherein $R_1$ and $R_2$ represents hydrogen or methyl and $r$ is 1 or 2, $m$ is a whole number from 1 to 3, $x$ is 0, 1 or 2, with $x$ being 0 or 1 if $m$ is 1, and $q'$ is 1 or 2.

In accordance with the definition of A, the compounds according to the invention contain an ethylene urea, hydantoin or isocyanurate group, so that the particularly suitable compounds according to the invention have the following formulae:

(3)

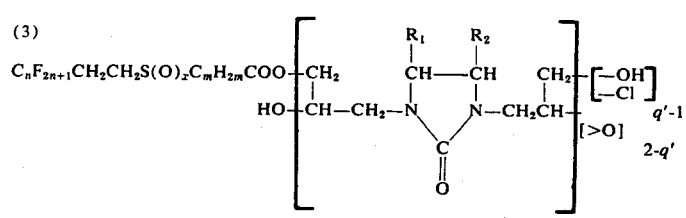

(4)

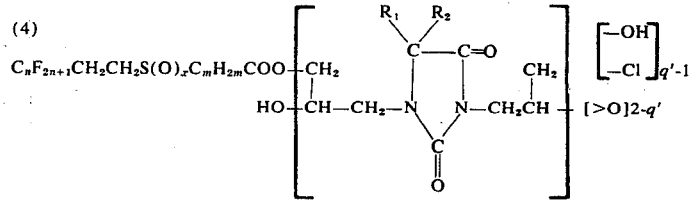

(5)

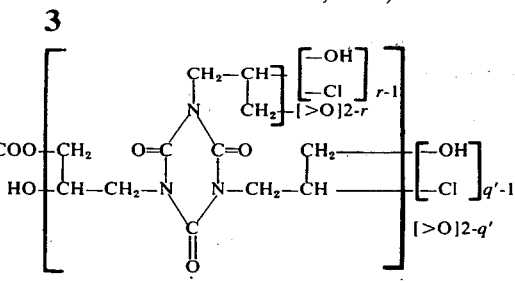

$C_nF_{2n+1}CH_2CH_2S(O)_xC_mH_{2m}COO-$ ...

wherein $R_1$ and $R_2$ represent hydrogen or methyl, $n$ is a whole number from 4 to 14, $m$ is a whole number from 1 to 3, $q'$ and $r$ are 1 or 2 and $x$ is 0, 1 or 2, with $x$ being 0 or 1 if $m$ is 1.

Particularly valuable compounds according to formula (3) then have the formulae (6)

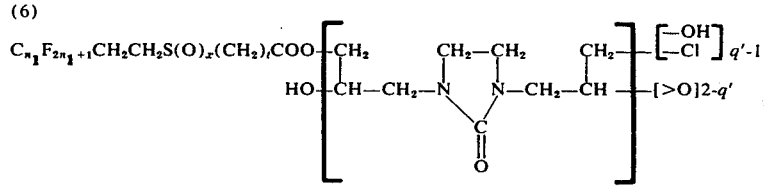

(7)

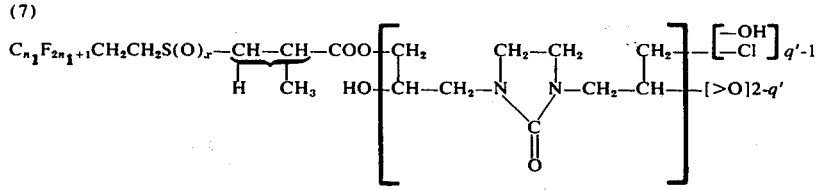

wherein $n_1$ is a whole number from 6 to 12, $q'$ and $t$ are 1 or 2 and $x$ is 0, 1 or 2, with $x$ being 0 or 1 if $t$ is 1.

The compounds which contain a hydantoin group in the molecule have by analogy the formulae (8)

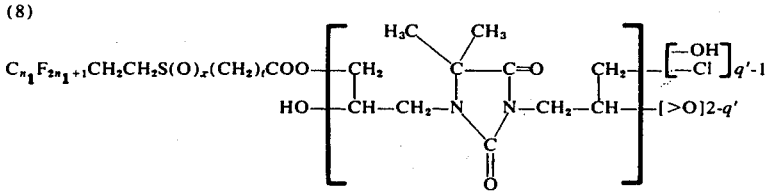

and
(9)

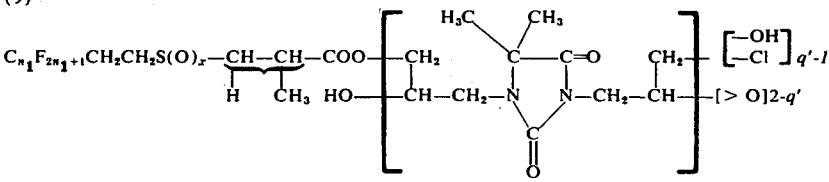

wherein $n_1$ is a whole number from 6 to 12, $q'$ and $t$ are 1 or 2 and $x$ is 0, 1 or 2, with $x$ being 0 or 1 if $t$ is 1.

The particularly valuable isocyanurate compounds finally have the formulae (10)

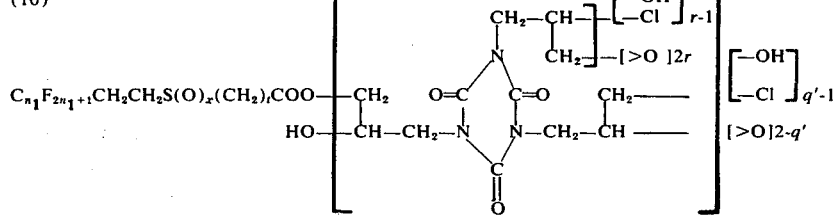

and
(11)

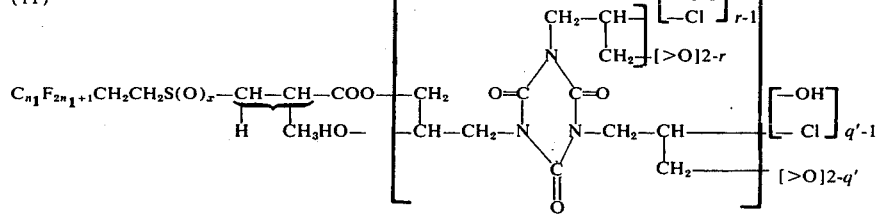

wherein $n_1$ is a whole number from 6 to 12, $q'$, $r$ and $t$ are 1 or 2 and $x$ is 0, 1 or 2, with $x$ being 0 or 1 if $t$ is 1.

The perfluoroalkylmonocarboxylic acid esters are virtually always isomeric mixtures in that they are manufactured from epoxides and, during the opening of the epoxide ring, the esterification with the corresponding perfluoroalkylmonocarboxylic acid can take place at both vicinal carbon atoms of the epoxide group.

The following compounds may be cited as examples of perfluoroalkylmonocarboxylic acid esters (for simplicity's sake, only one isomeric form is indicated):

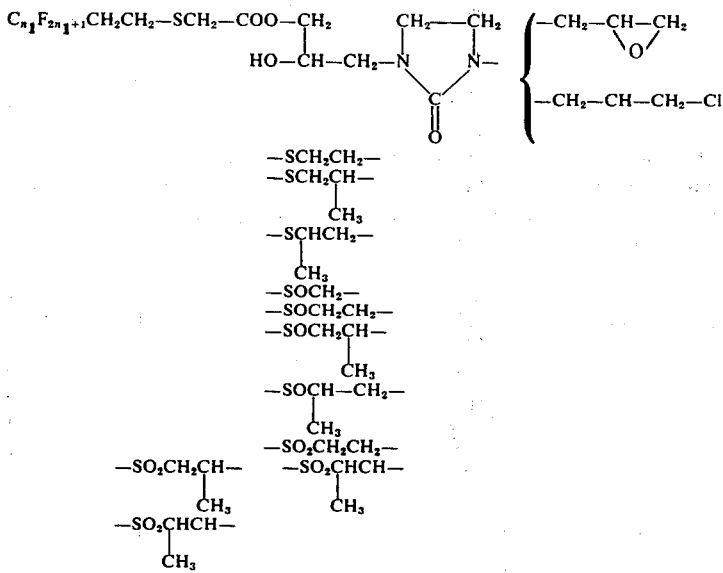

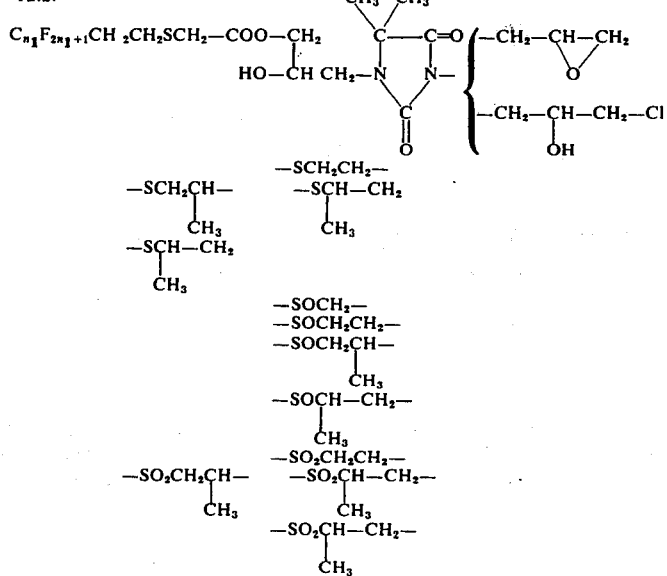

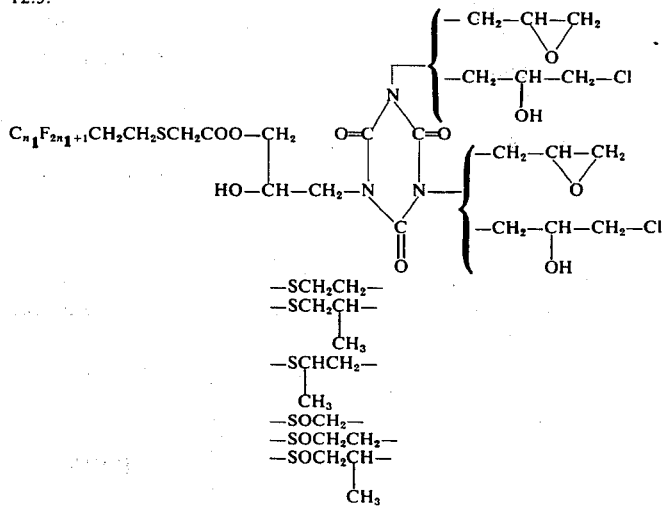

—SOCHCH₂—
       |
       CH₃

—SO₂CH₂CH₂—

—SO₂CH₂CH—
       |
       CH₃

—SO₂CHCH₂—
    |
    CH₃

Analogous groups of formulae apply in respect of compounds with 2 perfluoroalkyl radicals. One representative of each of these classes of compound is cited hereinbelow:

12.4.
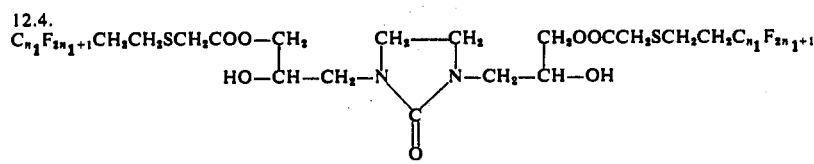

12.5.
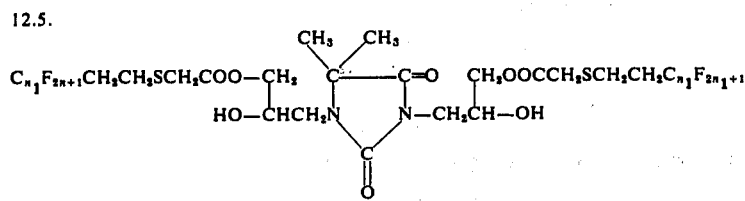

12.6.
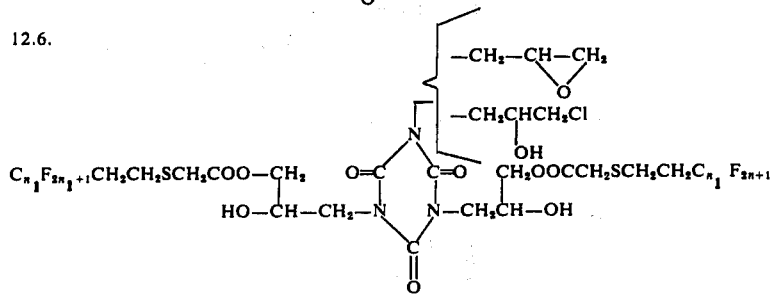

wherein $R_1$ and $R_2$ represent hydrogen or methyl and $r$ is 1 or 2, B is [—O—] or [—OH—Cl—], $m$ is a whole number from 1 to 3, $x$ is 0, 1 or 2, with $x$ being 0 or 1 if $m$ is 1, and $q$ is 1 or 2, which process consists in reacting perfluoroalkylcarboxylic acid esters of the formula (13)

$$R_f\text{—}(CH_2)_2\text{—}S(O)_x\text{—}C_mH_{2m}\text{—}COOH,$$

wherein $R_f$, $m$ and $x$ have the indicated meanings, with epoxides of the formula

(14)
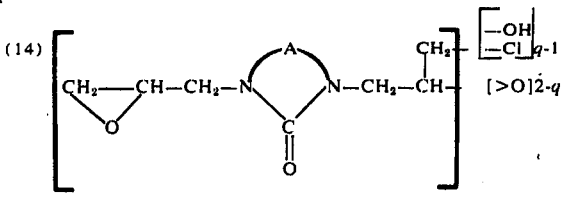

The present invention also provides a process for the manufacture of perfluoroalkylcarboxylic acid esters of the formula (1)
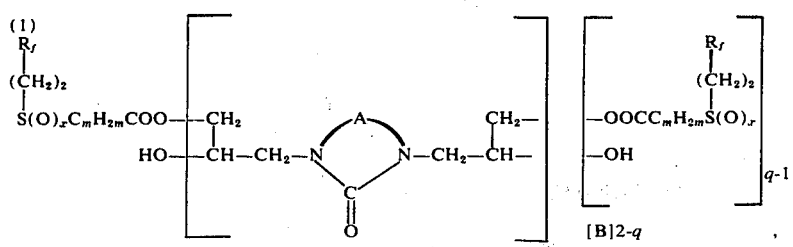

wherein $R_f$ represents a perfluoroalkyl radical with 4 to 18 carbon atoms, A represents a radical of the formula

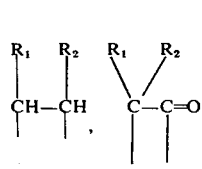 or 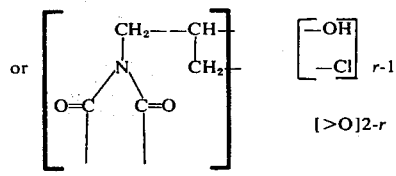

in which A and $q$ have the indicated meanings.

The molar ratios of acid to epoxide can be 1–2:1, preferably 1:1.

The reaction temperature is between 60° and 160°C, preferably between 100°C to 140°C. It is possible to react the two components either in a melt, in which case optionally temperatures of up to 160°C can be attained or the reaction is carried out in an organic solvent, at the boiling temperature of the solvent. Suitable solvents are those organic solvents whose boiling points are in the indicated temperature range, e.g. glycols, such as ethylene glycol or propylene glycol, glycol ethers, such as butyl glycol, esters, such as ethyl acetate, alcohols, such as propanol, isopropanol and butanol etc.

The reaction can also be carried out with advantage in the presence of a suitable catalyst, e.g. anhydrous sodium acetate.

The acids of the formula

(15)
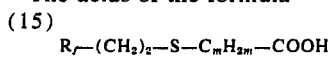

which are used for the reaction are known e.g. from U.S. Pat. No. 3,172,910. From these are obtained by oxidation the acids of the formulae

(16)
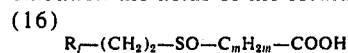
and
(17)
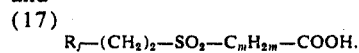
which are likewise used.

Advantageously there are used acids of the formula

(18)
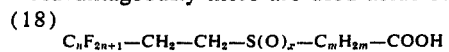

wherein $n$ is a whole number from 4 to 14, preferably from 6 to 12, $x$ is 0, 1 or 2, and $m$ is a whole number from 1 to 3, with $x$ being 0 or 1 if $m$ is 1.

The severally used acids have the formulae

(19)
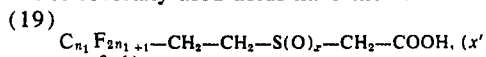

(20)
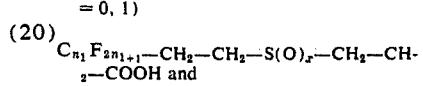

(21a)
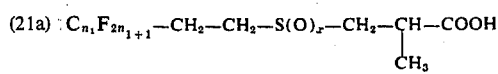

(21b)
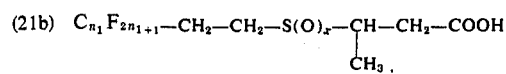

wherein $n_1$ is a whole number from 6 to 12 and $x$ is 0, 1 or 2.

The epoxides to be used in the reaction preferably have the formulae

(22)
(23)
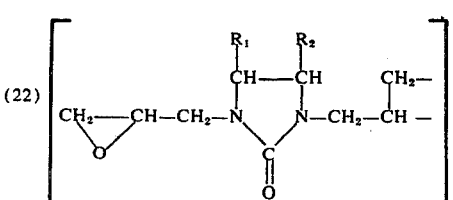

and

(24)
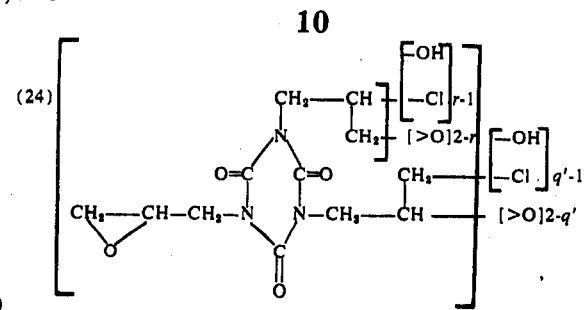

wherein $R_1$ and $R_2$ represent hydrogen or methyl and $q'$ and $r$ are 1 or 2, and the formulae

(25)
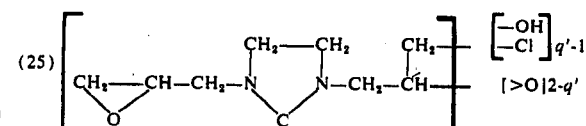

(26)
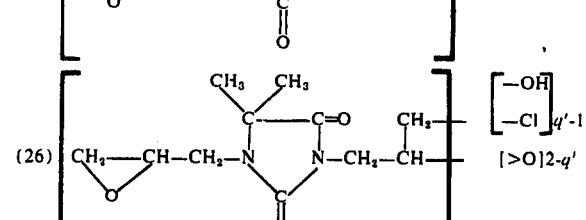

and

(27)
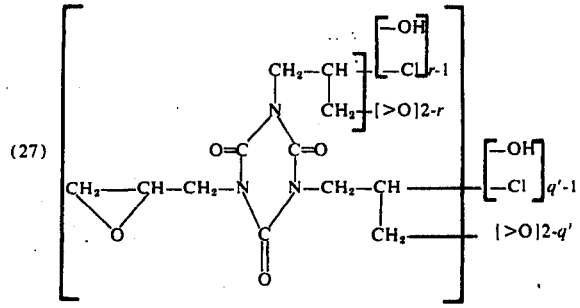

wherein $q'$ and $r$ are 1 or 2.

The following epoxides may be cited individually:

(28.1)
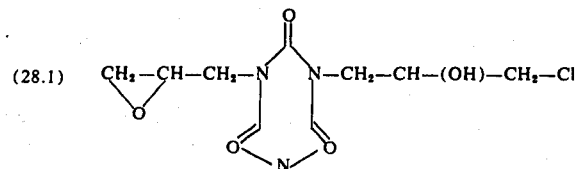

(28.2)
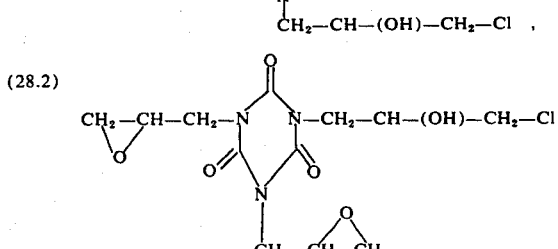

(28.3)
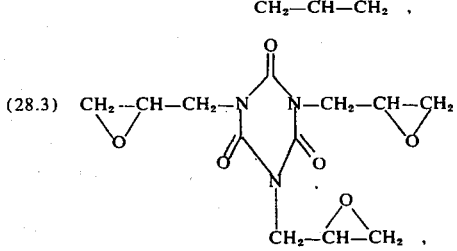

(28.4) 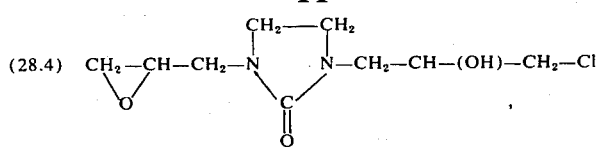

(28.5) 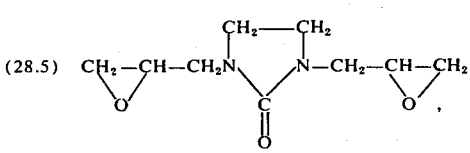

(28.6) 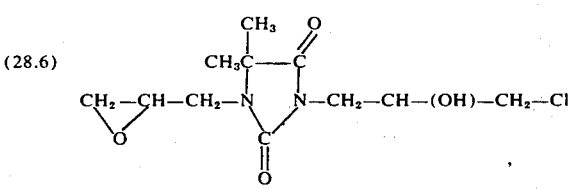

(28.7) 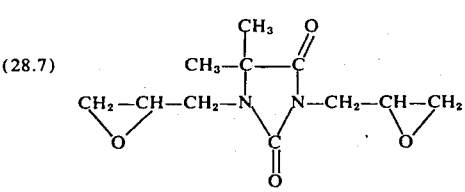

The epoxides used for the manufacture of the perfluoroalkylmonocarboxylic acid esters are known and are manufactured by methods which are known per se, e.g. by reacting the corresponding N-heterocyclic compound with epichlorohydrin.

Due to the presence of free hydroxyl groups, the perfluoroalkylcarboxylic esters according to the invention react with compounds which contain several functional groups which are capable of reaction with hydroxyl groups, e.g. 1,2-epoxide groups, isocyanate groups, acrylic groups, methylol groups, methylol groups which are etherified with lower alcohols, aldehyde groups, readily hydrolysable ester groups, amino groups etc. Such polyfunctional compounds are therefore suitable as cross-linking or hardening components for the perfluoroalkylcarboxylic acid esters according to the invention which contain hydroxyl groups.

As examples of such cross-linking components particular mention may be made of the following: epoxide compounds, i.e. polyglycidyl ethers, such as butane diol diglycidyl ether and diglycidyl ether, diisocyanates and polyisocyanates, e.g. o-, m- and p-phenylenediisocyanate, toluylene-2,4-diisocyanate, 1,5-naphthylenediisocyanate; acrylyl compounds, e.g. methylene bisacrylic amide and symmetrical triacrylyl perhydrotriazine; poly-(2,3-dihydro-1,4-pyranyl) compounds, e.g. (2,3-dihydro-1',4'-pyran-2'-yl)-methyl ester; aldehydes, e.g. formaldehyde or glyoxal, soluble phenol-formaldehyde condensation products, such as novalaks or resols. Preferably, aminoplasts which are soluble in water or organic solvents are used as cross-linking components, suitable examples of which are:

formaldehyde condensation products of urea, thiourea, guanidine, ethylene urea, glyoxal monourein, acetylene diurea, dicyandiamide, also of aminotriazines, such as melamine or of guanamines, such as acetoguanamine, benzoguanamine, tetrahydrobenzoguanamine or formoguanamine and ethers thereof with alcohols, e.g. methyl ether alcohol, propyl alcohol, propyl alcohol, allyl alcohol, butyl alcohol, amyl alcohol, hexyl alcohol, cyclohexanol, benzyl alcohol, lauryl alcohol, stearyl alcohol, oleyl alcohol or abietyl alcohol. In addition to the ether radicals, the condensation products can also contain radicals of higher molecular acids, e.g. stearic acid.

Particularly good technical results are obtained e.g. in the field of textile finishing on using water-soluble condensation products of formaldehyde and melamine or, in particular, of the esterification or etherification product of hexamethylol melamine methyl ether and stearic acid or stearyl alcohol, as cross-linking components, e.g. hexamethylol melamine pentamethyl ether, since in this way it is possible to obtain simultaneously an oil and water repellent effect. It is also frequently advantageous to use the perfluoroalkylcarboxylic acid esters as precondensates with cross-linking agents, e.g. amines or aminoplast precondensates.

The perfluoroalkylcarboxylic acid esters can also be used in admixture with polymers which do not contain fluorine. Highly suitable polymers which do not contain fluorine are in this connection e.g. the homopolymers of acrylic or methacrylic esters, such as polyethylacrylate, or copolymers of acrylic or methacrylic esters with methylol acrylic amide or methylol methacrylic amide.

On account of their reactive groups, the perfluoroalkylcarboxylic acid esters can be used for treating porous and non-porous substrates, preferably for producing oil repellent finishes thereon, either by incorporating them into the material in question or, above all, by applying them to the surface thereof. By porous substrates are meant leather or, preferably, fibrous materials, e.g. paper and textiles: suitable non-porous materials are plastics, and, above all, metal and glass surfaces.

The substrate can be treated with the perfluoroalkylcarboxylic acid esters according to the invention in one process step by themselves, or also in the same process step together with the application of further finishing agents, e.g. together with known water repellents such as paraffin emulsions, solutions or emulsions of fatty acid condensation products, e.g. with aminoplast precondensates, as mentioned hereinbefore.

Further, it is also possible to effect preferably on cotton a soil release and anti-soiling effect with the perfluoro compounds according to the invention.

Simultaneously with the oil repellent effect, these perfluoro compounds also exhibit water repellent properties. The substrates can be rendered oil repellent by treating them with solutions, dispersions or emulsions, of the perfluoro compounds. Perfluoroalkylcarboxylic acid esters can also for example be applied to the textile material in a solution with an organic solvent and fixed to the fabric by the application of heat after evaporation of the solvent.

Particular interest attaches to textile materials for finishing with the perfluoroalkylcarboxylic acid ester according to the invention. Such materials include e.g. those from natural or regenerated cellulose, e.g. cotton linen or rayon, staple fibre or cellulose acetate. But textiles from wool, synthetic polyamides, polyesters or polyacrylonitrile are also possible. Blended woven fabrics or blended knitted fabrics from cotton/polyester fibres can also be finished with advantage. The textiles can be in the form of threads, fibres, flocks, but preferably of non-wovens, woven or knitted fabrics.

Preparations which contain the perfluoro compounds according to the invention can be applied to the substrate in conventional, known manner. Woven fabrics are impregnated e.g. by the exhaustion process or immersion process or on a padder which is charged with the preparation at room temperature. The amount in which the perfluoro compounds are applied can be about 0.05 to 2 percent by weight of fluorine, preferably 0.05 to 1 percent by weight, preferably 0.1 to 0.4 percent by weight, based on the weight of the substrate. The impregnated material is then dried at 60° to 120°C and subsequently optionally subjected to a heat treatment of over 100°C, e.g. at 120° to 200°C.

The textiles treated thus exhibit as a rule a very oil repellent effect and, provided the preparation contains in addition a water repellent, this is coupled with a water repellent effect.

The following Examples will serve to illustrate the invention but do not in any way limit it. Parts and percentages are by weight.

EXAMPLE 1 a. 26.9 g (50 mmols, mol. wt. 538, $n=8$) of $C_nF_{2n+1}CH_2CH_2SCH_2$ COOH*) are heated in a preheated oil bath to 120°C together with 18.5 g (50 mmols, mol. wt. = 370) of the epoxide of the formula (28.1). While stirring, a clear, reddish brown melt forms. Induced by the exothermic reaction, which subsides after about 5 minutes, the temperature of the melt rises to about 130°C. The reaction is terminated after 15 minutes. After the melt has cooled, there are obtained 45.4 g (100% of theory) of compounds of the formula (101)

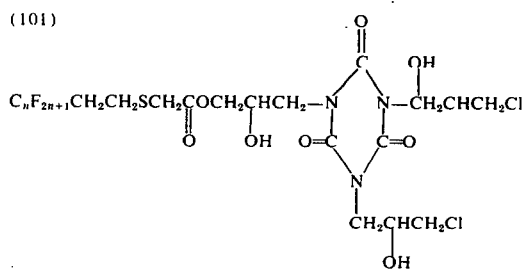

Melting point: 55°C / 75° to 85°C

Mass spectrum:

| n | 6 | 8 | 10 | 12 |
|---|---|---|----|----|
| mol. wt. (calculated) | 808 | 908 | 1008 | 1108 |
| mol. wt. (found, parent peaks) | 808 | 908 | 1008 | 1108 |

The molecular weights follow from the parent peaks.

b. The process is carried out in a manner analogous to that described in a) with 14.85 g (50 mmols, mol. wt. = 297) of the epoxide of the formula (28.3).

Yield: 41.7 g (100% of theory)

Mass spectrum:

| n | 6 | 8 | 10 | 12 |
|---|---|---|----|----|
| mol. wt. (calculated) | 735 | 835 | 935 | 1035 |
| mol. wt. (found, parent peaks) | 735 | 835 | 935 | 1035 |

Reaction product:

(102)

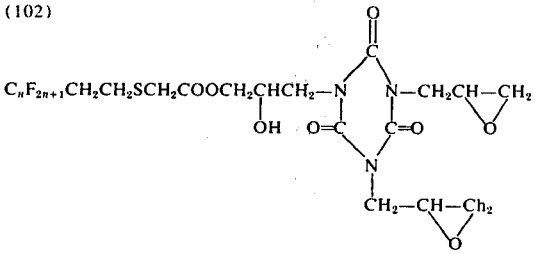

Manufacture of the epoxide:

80 g (0.62 mole) of cyanuric acid and 1320 g (14.3 moles) of epichlorohydrin are refluxed for 3½ hours in a 3 liter flask fitted with stirrer and reflux cooler, in the process of which the cyanuric acid passes completely into solution. The solution is then cooled to 40°C and 8.52 g of sodium hydroxide (97%) are added in finely powdered form, when sodium chloride precipitates. 150 ml of epichlorohydrin are subsequently distilled off. Then the precipitated sodium chloride is filtered off and further volatile constituents are removed from the filtrate in a water jet vacuum, to yield a solid residue which contains about 1.3 epoxide groups and 1.7 1-chloro-2-hydroxypropyl groups per molecule. The corresponding triazine derivatives with 2 or 3 epoxide groups are obtained by using the 2- or 3-fold amount of sodium hydroxide. It is also possible to manufacture the monoglycidyl and diglycidyl derivatives of ethylene urea and of dimethyl hydantoin in analogous manner.

EXAMPLE 2 a. 27.7 g (50 mmols, mol. wt. = 554, $n=8$) of $C_nF_{2n+1}CH_2CH_2SOCH_2COOH$*) together with 18.5 g (50 mmols, mol. wt. 370) of the epoxide of the formula (28.1) are heated to 140°C in a preheated oil bath. While stirring and accompanied by an exothermic reaction a melt is formed. The reaction is terminated after 20 minutes. A reaction product which solidifes on cooling is obtained in a yield of 46.2 g (100% of theory). Melting point: 74°C / 100° to 105°C.

Mass spectrum:

| n | 6 | 8 | 10 | 12 |
|---|---|---|----|----|
| mol. wt. (calculated) | 824 | 924 | 1024 | 1124 |
| mol. wt. (found, parent peaks) | 824 | 924 | 1024 | 1124 |

Formula of the reaction product:

(103)

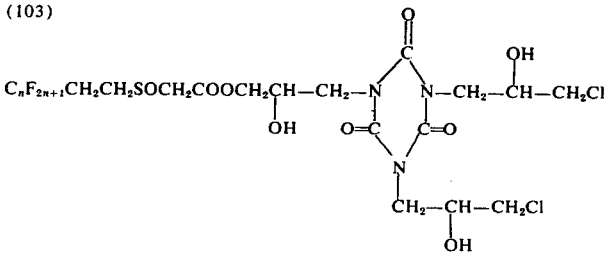

b. The process is carried out in a manner analogous to that described in (a) with 14.85 g (50 mmols, mol. wt. = 297) of the epoxide of the formula (28.3).

Yield: 42.5 g (100% of theory).

Mass spectrum:

| n | 6 | 8 | 10 | 12 |
|---|---|---|---|---|
| mol. wt. (calculated) | 751 | 851 | 951 | 1051 |
| mol. wt. (found, parent peaks) | 751 | 851 | 951 | 1051 |

Reaction product:

(104)

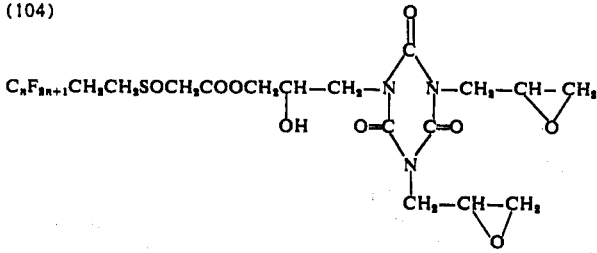

$C_nF_{2n+1}CH_2CH_2SOCH_2COOCH_2CH-CH_2-$ ...

EXAMPLE 3 a. 27.6 g (50 mmols, mol. wt. = 552, $n$=8) of $C_nF_{2n+1}CH_2CH_2SCH_2CH_2COOH^{**}$) are heated to 120°C in a preheated oil bath together with 18.5 g (50 mmols, mol. wt. = 370) of the epoxide of the formula (28.1). While stirring, a brown, clear melt is formed. Induced by the exothermic reaction, the temperature rises briefly to 150°C.

The reaction is terminated after 15 minutes. After cooling, there are obtained 46.1 g (100% of theory) of the compound of the formula (105)

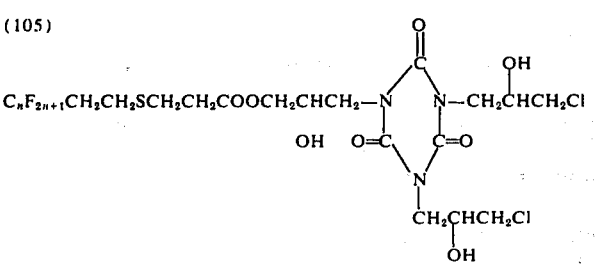

$C_nF_{2n+1}CH_2CH_2SCH_2CH_2COOCH_2CHCH_2-$ ...

Melting point: cannot be determined, tacky reaction product.

Mass spectrum:

| n | 6 | 8 | 10 | 12 |
|---|---|---|---|---|
| mol. wt. (calculated) | 822 | 922 | 1022 | 1122 |
| mol. wt. (found, parent peaks) | 822 | 922 | 1022 | 1122 | b. The process is carried out in a manner analogous to that described in (a) with 14.84 g (50 mmols, mol. wt. = 297) of the epoxide of the formula (28.3).

Yield: 42.4 g (100% of theory).

Mass spectrum:

| n | 6 | 8 | 10 | 12 |
|---|---|---|---|---|
| mol. wt. (calculated) | 749 | 849 | 949 | 1049 |
| mol. wt. (found, parent peaks) | 749 | 849 | 949 | 1049 |

Reaction product:

(106)

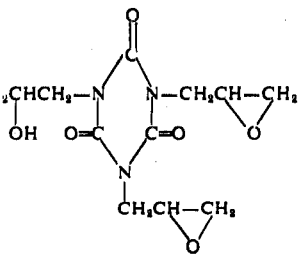

$C_nF_{2n+1}CH_2CH_2SCH_2CH_2COOCH_2CHCH_2-$ ...

c. The compound of the formula (106) is also obtained by reacting equimolar amounts of the acid and the epoxide (28.3), e.g. 0.1 mol of each dissolved in 400 ml of ethyl acetate, in the presence of 2.5 g of sodium acetate (anhydrous) for 12 hours at 80°C. The yield is 98% of theory. Instead of ethyl acetate, it is also possible to use isopropanol or butyl glycol as solvent.

EXAMPLE 4 a. 28.4 g (50 mmols, mol. wt. = 568, $n$=8) of $C_nF_{2n+1}CH_2CH_2SOCH_2CH_2COOH^{**}$) are heated to 135°C in a preheated oil bath together with 18.5 g (50 mmols, mol. wt. 370) of the epoxide of the formula (28.1). With stirring, there is formed a brown, clear melt. Induced by the exothermic reaction, the temperature rises briefly to 150°C.

The reaction is terminated after 15 minutes. After cooling, there are obtained 46.9 g (100% of theory) of the compound of the formula (107)

$C_nF_{2n+1}CH_2CH_2SOCH_2CH_2COOCH_2CHCH_2-$ ...

Melting point: 83°C / 100° to 105°C.

Mass spectrum:

| n | 6 | 8 | 10 | 12 |
|---|---|---|---|---|
| mol. wt. (calculated) | 838 | 938 | 1038 | 1138 |
| mol. wt. (found, parent peaks) | 838 | 938 | 1038 | 1138 | b. The process is carried out in a manner analogous to that described in (a) with 14.85 g (50 mmols, mol. wt. = 297) of the epoxide of the formula (28.3).

Yield: 43.2 g (100% of theory).

Mass spectrum:

| n | 6 | 8 | 10 | 12 |
|---|---|---|---|---|
| mol. wt. (calculated) | 765 | 865 | 965 | 1065 |
| mol. wt. (found, parent peaks) | 765 | 865 | 965 | 1065 |

Reaction product:

(108)

$C_nF_{2n+1}CH_2CH_2SOCH_2CH_2COOCH_2CHCH_2$—

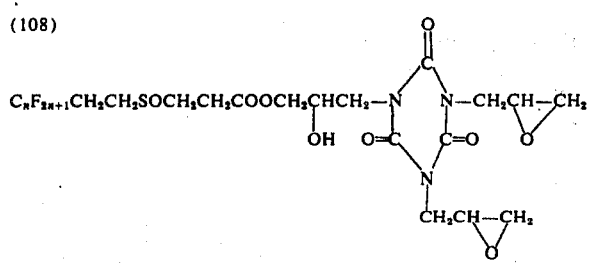

EXAMPLE 5 a. 29.2 g (50 mmols, mol. wt. = 584, $n$=8) of $C_nF_{2n+1}CH_2CH_2SO_2CH_2CH_2COOH^{**}$) are heated to 150°C in a preheated oil bath together with 18.5 g (50 mmols, mol. wt. = 370) of the epoxide of the formula (28.3). With stirring, there is formed a clear, brown melt. Induced by the exothermic reaction, the temperature rises briefly to 175°C. The reaction is terminated after 15 minutes. After cooling, there are obtained 47.7 g (100% of theory) of the compound of the formula (109)

$C_nF_{2n+1}CH_2CH_2SO_2CH_2CH_2COOCH_2CH$—$CH_2$—N

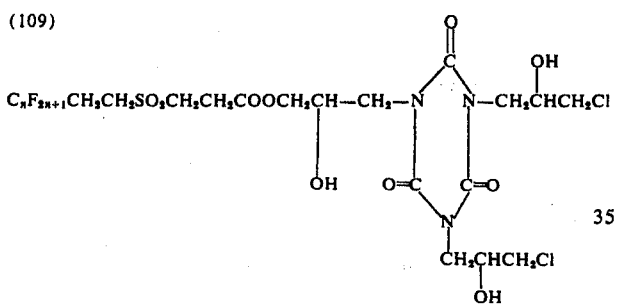

Melting point: 100°C / 125° to 130°C

Mass spectrum:

| n | 6 | 8 | 10 | 12 |
|---|---|---|---|---|
| mol. wt. (calculated) | 854 | 954 | 1054 | 1154 |
| mol. wt. (found, parent peaks) | 854 | 954 | 1054 | 1154 | b. The process is carried out in a manner analogous to that described in (a) with 14.85 g (50 mmols, mol. wt. = 297) of the epoxide of the formula (28.3).

Yield: 44 g (100% of theory)

Mass spectrum:

| n | 6 | 8 | 10 | 12 |
|---|---|---|---|---|
| mol. wt. (calculated) | 781 | 881 | 981 | 1081 |
| mol. wt. (found, parent peaks) | 781 | 881 | 981 | 1081 |

Reaction product:

(110)

$C_nF_{2n+1}CH_2CH_2SO_2CH_2CH_2COOCH_2CHCH_2$—N

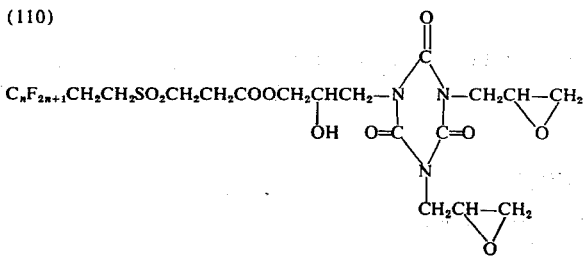

EXAMPLE 6

28.3 g (50 mmols, mol. wt. = 566, $n$=8) of $C_nF_{2n+1}CH_2CH_2SCH_2$

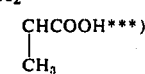

$CH_3$ are heated to 120°C in a preheated oil bath together with 14.85 g (50 mmols, mol. wt. = 297) of the epoxide of the formula (28.3). With stirring, there is formed a clear, brown melt. Induced by the exothermic reaction, the temperature rises to 150°C. The reaction is terminated after 15 minutes. After cooling there are obtained 43.1 g (100% of theory) of the compound of the formula (111)

$C_nF_{2n+1}CH_2CH_2SCH_2CHCOOCH_2CHCH_2$—N

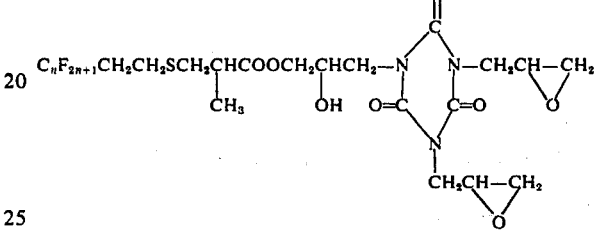

Mass spectrum:

| n | 6 | 8 | 10 | 12 |
|---|---|---|---|---|
| mol. wt. (calculated) | 763 | 863 | 963 | 1063 |
| mol. wt. (found, parent peaks) | 763 | 863 | 963 | 1063 |

EXAMPLE 7 a. 26.9 g (50 mmols, mol. wt. = 538, $n$=8) of $C_nF_{2n+1}CH_2CH_2SCH_2COOH^*$) are heated to 120°C in a preheated oil bath together with 9.9 g (50 mmols), mol. wt. = 198) of the epoxide of the formula (28.5). With stirring, there forms a clear, brown melt. Induced by the exothermic reaction, the temperature rises briefly to 128°C. The reaction is terminated after 15 minutes. After cooling, there are obtained 36.8 g (100% of theory) of the compound of the formula (112)

$C_nF_{2n+1}CH_2CH_2SCH_2COOCH_2CHCH_2$—N

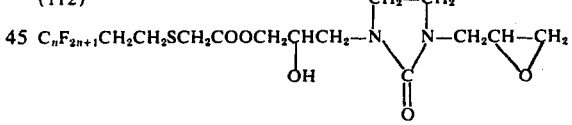

Mass spectrum:

| n | 6 | 8 | 10 | 12 |
|---|---|---|---|---|
| mol. wt. (calculated) | 636 | 736 | 836 | 936 |
| mol. wt. (found, parent peaks) | 636 | 736 | 836 | 936 | b. The procedure is carried out in analogous manner to that described in (a), but using 27.7 g (50 mmols, mol. wt. = 554, $n$=8) of $C_nF_{2n+1}CH_2CH_2SOCH_2COOH^*$).

Reaction temperature: 140° to 145°C. Yield: 37.6 g (100% of theory)

Mass spectrum:

| n | 6 | 8 | 10 | 12 |
|---|---|---|---|---|
| mol. wt. (calculated) | 652 | 752 | 852 | 952 |
| mol. wt. (found, parent peaks) | 652 | 752 | 852 | 952 |

Reaction product:

(113)

$C_nF_{2n+1}CH_2CH_2SOCH_2COOCH_2CHCH_2$—N

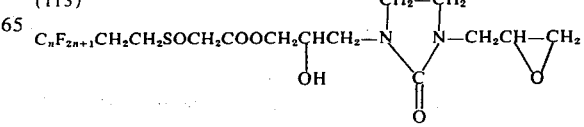

EXAMPLE 8 a. 27.6 g (50 mmols, mol. wt. = 552, $n=8$) of $C_nF_{2n+1}CH_2CH_2SCH_2CH_2COOH^{**}$) are heated to 120°C in a preheated oil bath together with 9.9 g (50 mmols, mol. wt. = 198) of the epoxide of the formula (28.5). With stirring, there forms a brown, clear melt. Induced by the exothermic reaction, the temperature rises briefly to 143°C. The reaction is terminated after 15 minutes. After cooling, there are obtained 37.5 g (100% of theory) of the compound of the formula (114)

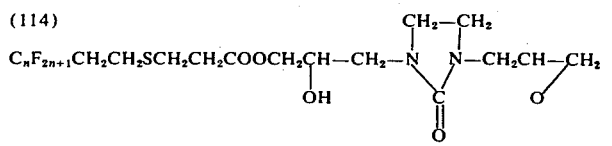

Mass spectrum:

| n | 6 | 8 | 10 | 12 |
|---|---|---|---|---|
| mol. wt. (calculated) | 650 | 750 | 850 | 950 |
| mol. wt. (found, parent peaks) | 650 | 750 | 850 | 950 | b. Reaction as in (a) with $C_nF_{2n+1}CH_2CH_2SOCH_2CH_2COOH^{**}$).

Reaction temperature: 135° to 148°C. Yield: 38.3 g (100% of theory)

Reaction product:

(115)

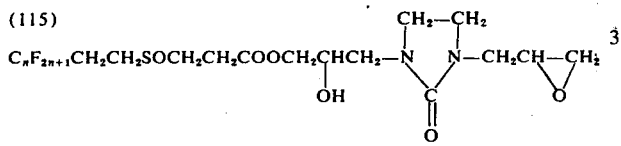

Mass spectrum:

| n | 6 | 8 | 10 | 12 |
|---|---|---|---|---|
| mol. wt. (calculated) | 666 | 766 | 866 | 966 |
| mol. wt. (found, parent peaks) | 666 | 766 | 866 | 966 | c. Reaction as in (a) with $C_nF_{2n+1}CH_2CH_2SO_2CH_2CH_2COOH^{**}$).

Reaction temperature: 150° to 155°C.

Reaction product:

(116)

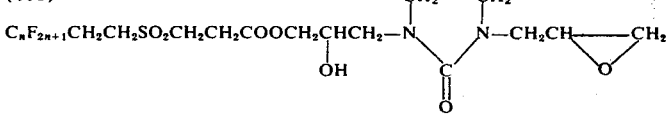

Mass spectrum:

| n | 6 | 8 | 10 | 12 |
|---|---|---|---|---|
| mol. wt. (calculated) | 682 | 782 | 882 | 982 |
| mol. wt. (found, parent peaks) | 682 | 782 | 882 | 982 | d. The compound of the formula (114) is also obtained by reaction of equimolar amounts of the acid with the epoxide (28.5), e.g. 0.1 of each dissolved in 400 ml of ethyl acetate. The reaction is carried out in the presence of 2.5 g of sodium acetate (anhydrous) at 80°C over the course of 12 hours. The yield is 94% of theory.

EXAMPLE 9 a. 26.9 g (50 mmols, mol. wt. = 338, $n=8$) of $C_nF_{2n+1}CH_2CH_2SCH_2COOH^*$) are heated to 120°C in a preheated oil bath together with 12 g (50 mmols, mol. wt. = 240) of the epoxide (28.7). With stirring, there forms a clear melt. Induced by the exothermic reaction, the temperature rises briefly to 128°C. The reaction is terminated after 15 minutes. After cooling there are obtained 38.9 g (100% of theory) of the compound of the formula (117)

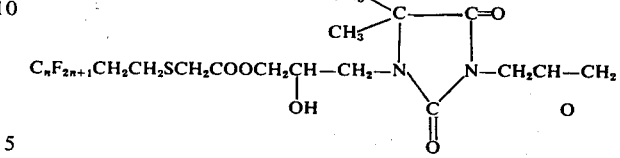

Mass spectrum:

| n | 6 | 8 | 10 | 12 |
|---|---|---|---|---|
| mol. wt. (calculated) | 678 | 778 | 878 | 978 |
| mol. wt. (found, parent peaks) | 678 | 778 | 878 | 978 | b. Reaction as in (a) with $C_nF_{2n+1}CH_2CH_2SOCH_2COOH^*$).

Reaction temperature: 140° to 143°C. Yield: 39.7 g (100% of theory)

Reaction product:

(118)

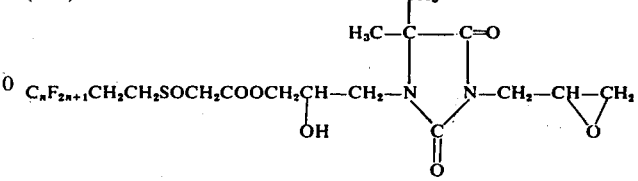

Mass spectrum:

| n | 6 | 8 | 10 | 12 |
|---|---|---|---|---|
| mol. wt. (calculated) | 694 | 794 | 894 | 994 |
| mol. wt. (found, parent peaks) | 694 | 794 | 894 | 994 | c. Reaction as in (a) with $C_nF_{2n+1}CH_2CH_2SCH_2CH_2COOH^{**}$)

Reaction temperature: 120° to 133°C.

Reaction product:

(119)

Mass spectrum:

| n | 6 | 8 | 10 | 12 |
|---|---|---|---|---|
| mol. wt. (calculated) | 692 | 792 | 892 | 992 |
| mol. wt. (found, parent peaks) | 692 | 792 | 892 | 992 | d. Reaction as in (a) with $C_nF_{2n+1}CH_2CH_2SOCH_2CH_2COOH$(**).

Reaction temperature: 135° to 147°C Yield: 40.4 g (100 g of theory)
Reaction product:

in 400 ml of butyl glycol and the solution is refluxed (125°C) for 12 hours in the presence of 2.5 g of sodium acetate. The solvent is subsequently distilled off in vacuo to yield 125 g (89% of theory) of the compounds of the formula (122)

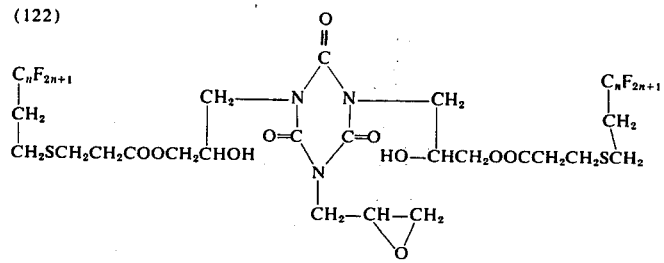

Composition of the acids used:

| | | $C_{n_1}F_{2n_1+1}$—$C_2H_4$—$S(O)_o$—$C_mH_{2m}$—COOH | $o = 0, 1, 2$ |
|---|---|---|---|
| *) | 25% | $C_6F_{13}$—$C_2H_4$—$S(O)_o$—$CH_2$—COOH | ($o = 0, 1$) |
| | 45% | $C_8F_{17}$—$C_2H_4$—$S(O)_o$—$CH_2$—COOH | ($o = 0, 1$) |
| | 25% | $C_{10}F_{21}$—$C_2H_4$—$S(O)_o$—$CH_2$—COOH | ($o = 0, 1$) higher homologes |
| | 5% | $C_{12}F_{25}$—$C_2H_4$—$S(O)_o$—$CH_2$—COOH | ($o = 0, 1$) |
| **) | 25% | $C_6F_{13}$—$C_2H_4$—$S(O)_o$—$C_2H_4$—COOH | |
| | 45% | $C_8F_{17}$—$C_2H_4$—$S(O)_o$—$C_2H_4$—COOH | |
| | 25% | $C_{10}F_{21}C_2H_4$—$S(O)_o$—$C_2H_4$—COOH | |
| | 5% | $C_{12}F_{25}$—$C_2H_4$—$S(O)_o$—$C_2H_4$—COOH | and higher homologes |
| ***) | 25% | $C_6F_{13}$—$C_2H_4$—$S(O)_o CH_2$—CH—($CH_3$)—COOH | |
| | 45% | $C_8F_{17}$—$C_2H_4$—$S(O)_o$—$CH_2$—CH—($CH_3$)—COOH | |
| | 25% | $C_{10}F_{21}$—$C_2H_4$—$S(O)_o$—$CH_2$—CH—($CH_3$)COOH | |
| | 5% | $C_{12}F_{25}$—$C_2H_4$—$S(O)_o$—$CH_2$—CH—($CH_3$)—COOH | and higher homologes |

(120)

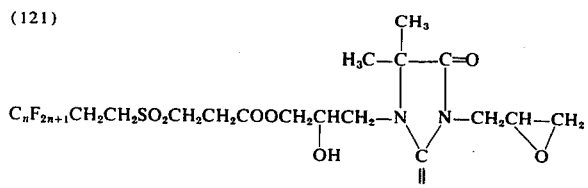

Mass spectrum:

| n | 6 | 8 | 10 | 12 |
|---|---|---|---|---|
| mol. wt. (calculated) | 708 | 808 | 908 | 1008 |
| mol. wt. (found, parent peaks) | 708 | 808 | 908 | 1008 |

Reaction as in a) with $C_nF_{2n+1}CH_2CH_2SO_2CH_2CH_2COOH$**.

Reaction temperature: 150° to 162°C. Yield: 41.2 g (100% of theory).
Reaction product:

(121)

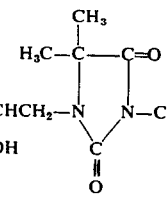

Mass spectrum:

| n | 6 | 8 | 10 | 12 |
|---|---|---|---|---|
| mol. wt. (calculated) | 724 | 824 | 924 | 1024 |
| mol. wt. (found, parent peaks) | 724 | 824 | 924 | 1024 |

EXAMPLE 10

110.4 g (0.2 mole) of the compound of the formula $C_nF_{2n+1}CH_2CH_2SCH_2CH_2COOH$**) are dissolved with 29.7 g (0.1 mole) of the epoxide of the formula (28.3)

APPLICATION EXAMPLES

EXAMPLE 11

Cotton and cotton/polyester fabrics (PES/CO) (67/33) are impregnated at room temperature with a solution in dioxan of the compounds according to the invention, then dried and cured for 4½ minutes at 150°C. The fluorine layer on the cotton fabrics is 0.28 percent by weight based on the weight of the fibre material; on the polyester/cotton blended fabrics, it is 0.2 percent by weight.

The oil repellency is assessed by method 118–1966 T of the AATTC. The rating scale employed is from 1 to 8, with 8 being the best rating (no wetting with n-heptane). All finishing substrates exhibit a good soil-release behaviour.

| | Oil Repellencies | |
|---|---|---|
| Compound of the formula | cotton | PES/CO (67/33) |
| 101 | 6 | 6 |
| 103 | 6 | 6 |
| 105 | 7 | 6 |
| 106 | 7 | 6 |
| 107 | 7 | 6 |
| 109 | 7 | 6 |
| 110 | 7 | 6 |
| 112 | 6 | 6 |
| 121 | 6 | 6 |

EXAMPLE 12

Fabrics of cotton (CO), polyester/cotton (PES/CO) (67/33), polyamide (PA), polyester (PES), polyacrylonitrile (PAC) and wool (Wo) are impregnated with the foolowing liquors, subsequently dried, and cured. The oil repellencies are obtained according to Example 11.

Table 1 indicates the liquor compositions and Table 2 the oil repellencies:

Table 1

| liquor g/l | 1 | 2 | 3 | 4 | 5 |
|---|---|---|---|---|---|
| Compound of the formula (106) | 3,3 | 6,6 | 11,0 | | |
| Compound of the formula (114) | | | | 8,0 | |
| Compound of the formula (122) | | | | | 3,5 |
| Catalyst*) | 0,1 | 0,1 | | | |
| isopropanol | | | 116 | 40 | 350 |
| dioxan | 1000 | 1000 | | | |
| water | | | 884 | 960 | 750 |

*)benzyltrimethylammonium hydroxide

Table 2

| Substrate | Oil Repellencies liquor | | | | |
|---|---|---|---|---|---|
| | 1 | 2 | 3 | 4 | 5 |
| CO | 6 | 6 | 8 | 4 | 6 |
| PES/CO | 4 | 6 | 8 | 4 | 5 |
| PA | 6 | 6 | 8 | 4 | 6 |
| PES | 6 | 6 | 8 | — | 6 |
| PAC | 6 | 6 | — | — | 6 |
| Wo | 5–6 | 6 | — | — | 6 |

All finished substrates are hydrophilic.

We claim:
1. A perfluoroalkylcarboxylic acid ester of the formula

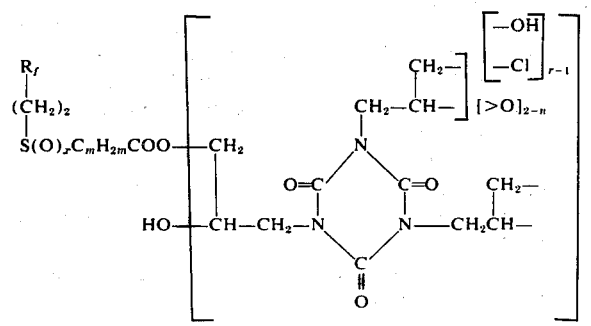

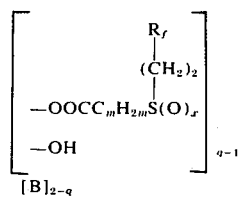

wherein $R_f$ represents a perfluoroalkyl radical with 4 to 18 carbon atoms, $r$ is 1 or 2, B is [—O—] or [—OH Cl—], $m$ is a whole number from 1 to 3, $q$ is 1 or 2 and $x$ is 0, 1 or 2, with $x$ being 0 or 1 if $m$ is 1.

2. A perfluoroalkylcarboxylic acid ester according to claim 1 wherein the perfluoroalkyl radical contains from 4 to 14 carbon atoms.

3. A perfluoroalkylcarboxylic acid ester according to claim 1, of the formula

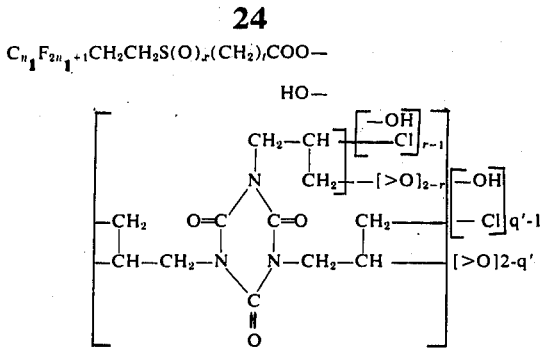

wherein $n_1$ is a whole number from 6 to 12, $q'$, $r$ and $t$ are each 1 or 2 and $x$ is 0, 1 or 2, with $x$ being 0 or 1 of $t$ is 1.

4. A perfluoroalkylcarboxylic acid ester according to claim 1, of the formula

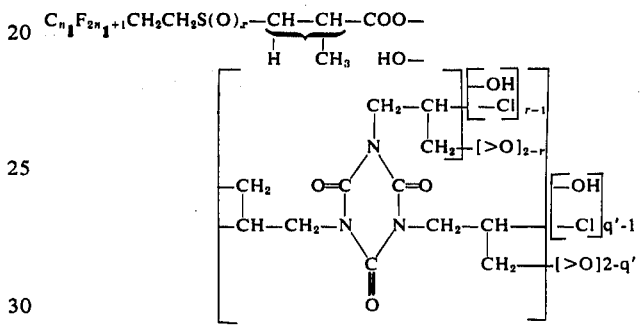

wherein $n_1$ is a whole number from 6 to 12, $q'$ and $r$ are 1 or 2 and $x$ is 0, 1 or 2.

5. A perfluoroalkylcarboxylic acid ester according to claim 1, of the formula

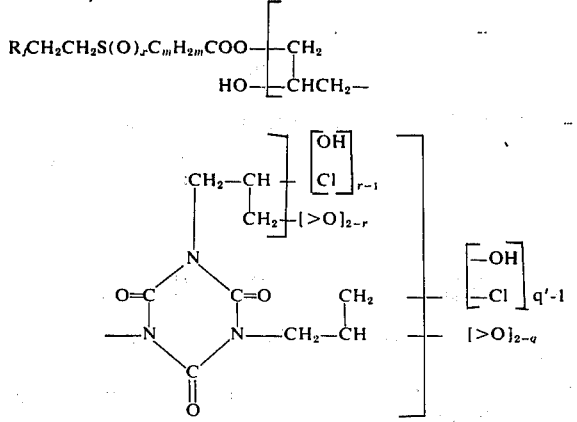

wherein $R_f$ represents a perfluoroalkyl radical with 4 to 18 carbon atoms, $r$ is 1 or 2, $m$ is a whole number from 1 to 3, $x$ is 0, 1 or 2, with $x$ being 0 or 1 if $m$ is 1, and $q'$ is 1 or 2.

6. A perfluoroalkylcarboxylic acid ester according to claim 1, of the formula

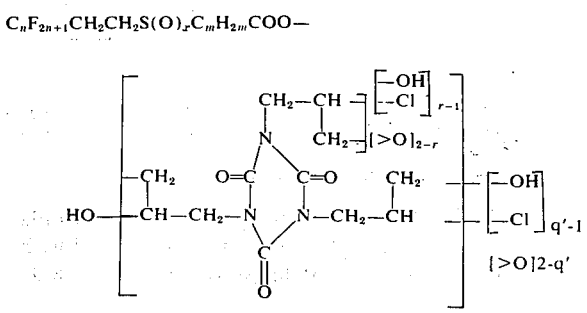

wherein $n$ is a whole number from 4 to 14, $m$ is a whole number from 1 to 3, $q'$ and $r$ are 1 or 2 and $x$ is 0, 1 or 2, with $x$ being 0 or 1 if $m$ is 1.

7. A perfluoroalkylcarboxylic acid ester according to claim 1, of the formula

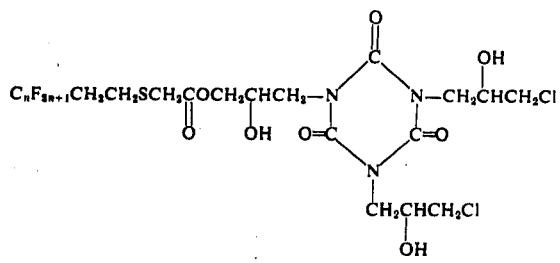

where $n$ is a whole number from 6 to 12.

8. A perfluoroalkylcarboxylic acid ester according to claim 1, of the formula

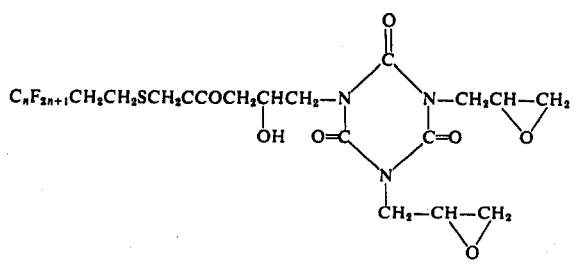

where $n$ is a whole number from 6 to 12.

9. A perfluoroalkylcarboxylic acid ester according to claim 1, of the formula

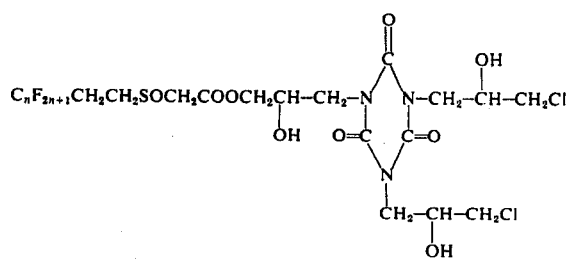

where $n$ is a whole number from 6 to 12.

10. A perfluoroalkylcarboxylic acid ester according to claim 1, of the formula

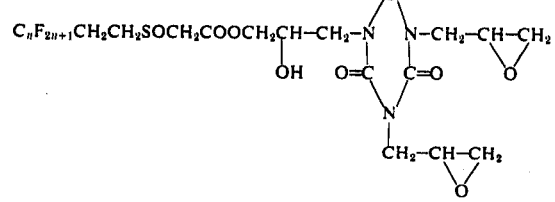

where $n$ is a whole number from 6 to 12.

11. A perfluoroalkylcarboxylic acid ester according to claim 1, of the formula

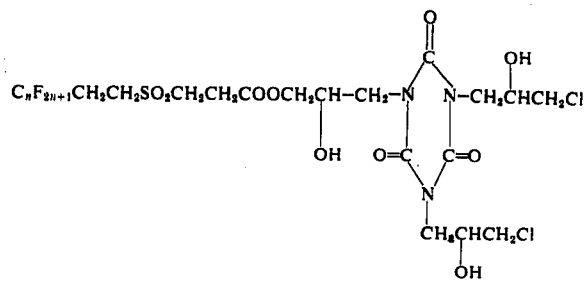

where $n$ is a whole number from 6 to 12.

12. A perfluoroalkylcarboxylic acid ester according to claim 1, of the formula

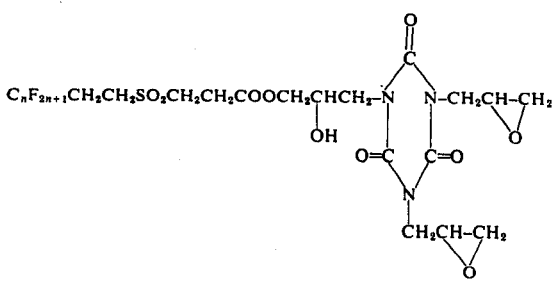

where $n$ is a whole number from 6 to 12.

* * * * *

UNITED STATES PATENT AND TRADEMARK OFFICE
CERTIFICATE OF CORRECTION

PATENT NO. : 3,914,225
DATED : October 21, 1975
INVENTOR(S) : ARMIN HIESTAND ET AL It is certified that error appears in the above-identified patent and that said Letters Patent are hereby corrected as shown below:

Column 23, claim 1, line 43, amend the upper right hand side of the structural formula to read:

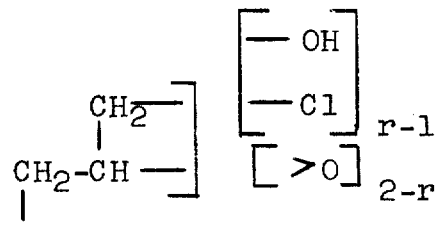

Column 24, claim 5, line 47, amend the right hand side of the structural formula to read:

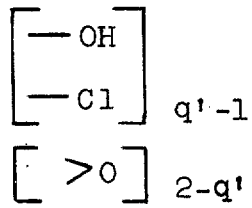

Column 25, claim 8, line 25 amend the left side of the structural formula to read:

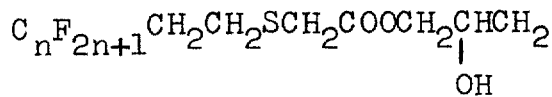

Signed and Sealed this twenty-seventh Day of April 1976

[SEAL]

Attest:

RUTH C. MASON
Attesting Officer

C. MARSHALL DANN
Commissioner of Patents and Trademarks